Figure 1:
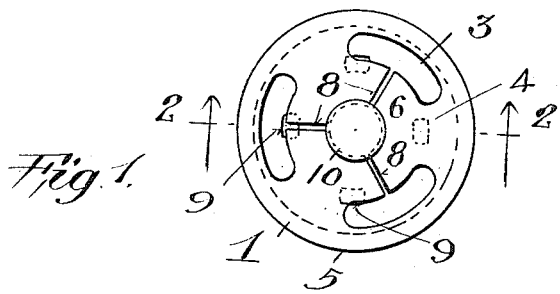

I. ANDERSON.
SNAP FASTENER.
APPLICATION FILED FEB. 26, 1917.

1,265,719.

Patented May 14, 1918.

Inventor
Ingemar Anderson
By his atty, Fred Francis Weiss

UNITED STATES PATENT OFFICE.

INGEMAR ANDERSON, OF RIDGEFIELD PARK, NEW JERSEY.

SNAP-FASTENER.

1,265,719.

Specification of Letters Patent. Patented May 14, 1918.

Application filed February 26, 1917. Serial No. 150,976.

*To all whom it may concern:*

Be it known that I, INGEMAR ANDERSON, a subject of the King of Sweden, and resident of Ridgefield Park, State of New Jersey, have made a certain new and useful Invention in Snap-Fasteners, of which the following is a specification.

This invention relates to snap fasteners and has for its object to provide an improved spring snap fastener which is simple in structure, efficient in operation, and exceedingly cheap in manufacture. A further object of the invention is to provide a snap fastener of this character which is not liable to injury from mangling or ironing in the usual laundry operations.

Further objects of the invention will appear more fully hereinafter.

The invention consists substantially in the construction, combination, location and relative arrangement of parts, all as will be more fully hereinafter set forth as shown in the accompanying drawing and finally pointed out in the appendant claims.

Referring to the drawing;—

Figure 2:
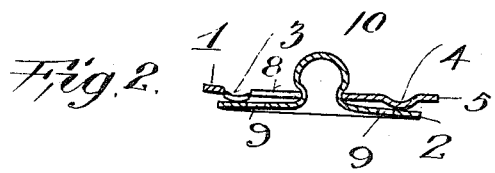
Figure 3:
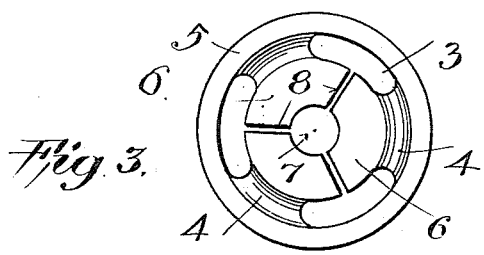
Figure 4:
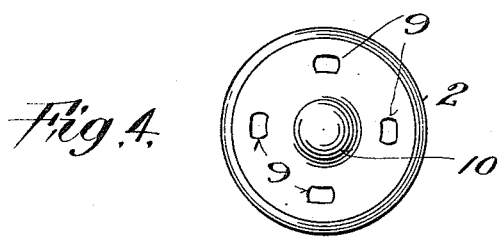

Figure 1 is a top plan view of an assembled spring fastener, embodying my invention. Fig. 2 is a sectional view of the same taken on the line 2—2, Fig. 1 and looking in the direction of the arrows. Fig. 3 is a top plan view of the female section of the snap fastener. Fig. 4 is a similar view of the male section of the snap fastener.

The same part is designated by the same reference numerals wherever it occurs throughout the several views.

It is the purpose of my invention to provide a snap fastener which is exceedingly cheap of manufacture, the respective sections of which may be made with but a single stamping and to the female section of which an exceptionally great amount of resiliency is imparted, due to the particular form of the same, thereby providing an exceptionally efficient clasp which effectually retains the male section secured thereto, but at the same time allows the male section to be withdrawn from engagement therewith without the danger of springing the engaging portions of the female section and thereby diminishing its retaining power.

In the drawing I show the female section at 1 and the male section at 2. The female section comprises a ring which has stamped out of the same a plurality of circumferentially extending slots 3, the intervening portions of the body of the section 1 indicated at 4, being depressed by the stamping thereof. In effect, this forms the ring 1 with a circumferential band 5, in the same plane of which remains the body portions 6 of the section. In the same operation of stamping out the circumferentially extended slots 3, a circular portion 7 is likewise stamped out of the exact center of the section, and comparatively small radially extending slots 8, one for each circumferentially extended slot 3, extends between the central hole 7 and said slots 3.

With this structure it will be seen that I provide a female section in which is secured great resiliency and wherein the liability of injury from any cause is reduced to a minimum. The circumferentially extended slots 3 may be utilized for sewing this section of the fastener to the garment; that is, the threads for securing this section to the garment may pass through these slots without in any way interfering with the operation of the spring securing portions thereof. The male section 2 is of the usual structure and comprises the flat portion provided with a plurality of openings 9 to accommodate the threads for securing the same to the garment and a central located head 10 of larger diameter than the central opening 7 of the female section. The operation of the device is obvious. The resiliency of the spring portion 6 of the fastener allows the head 10 of the male portion 2 to be inserted through the hole 7 and also effectually serves to retain the male section inserted therein.

Having now set forth the object and nature of my invention and having shown and described a specific structure embodying the principles, what I claim as new and useful, and all my own invention, and desire to secure by Letters Patent is;—

1. A snap fastener comprising a flat ring provided with circumferentially extending slots and spring elements, said spring elements being depressed circumferentially below the plane of the body of said flat ring at the portion thereof in which said circumferential slots are located, and provided with a central opening therethrough and radially extended slots extending from said central opening to said circumferentially extended slots, and a complementary piece provided with a projection thereon of larger diameter than said central opening, adapted to be inserted therethrough.

2. A snap fastener comprising a flat ring provided with circumferentially extending slots and spring elements, said spring elements being circumferentially depressed at one portion thereof below the plane of the body of said flat ring, and provided with a central opening therethrough and radially extended slots extending from said central opening to said circumferentially extended slots, and a complementary piece provided with a projection thereon of larger diameter than said central opening, adapted to be inserted therethrough, and perforations in said complementary piece for the reception of stitches.

3. The combination with a flat ring provided with circumferentially extending slots and a central opening, and comparatively narrow radially extending slots, extending between said central opening to each of said circumferentially extending slots and the portion of said flat ring between said circumferentially extending slots being depressed below the plane of said flat ring substantially as and for the purpose described.

Signed at New York city, New York, this 23rd day of February, one thousand nine hundred and seventeen.

INGEMAR ANDERSON.

Witnesses:
FRED. FERRISS,
MARIAN FOSTER.